US012771446B2

(12) United States Patent
Mohammed

(10) Patent No.: US 12,771,446 B2
(45) Date of Patent: Oct. 20, 2026

(54) ROBUST FLAT-TOP OPTICAL FILTER DESIGN UTILIZING PHASE AND POWER SPLITTING RATIO OF MMI COUPLERS

(71) Applicant: XILINX, INC., San Jose, CA (US)

(72) Inventor: Zakriya Mohammed, San Jose, CA (US)

(73) Assignee: XILINX, INC., San Jose, CA (US)

( * ) Notice: Subject to any disclaimer, the term of this patent is extended or adjusted under 35 U.S.C. 154(b) by 199 days.

(21) Appl. No.: 18/889,149

(22) Filed: Sep. 18, 2024

(65) Prior Publication Data

US 2026/0081684 A1 Mar. 19, 2026

(51) Int. Cl.
*H04B 10/079* (2013.01)
*H04J 14/02* (2006.01)

(52) U.S. Cl.
CPC .... *H04B 10/07953* (2013.01); *H04J 14/0221* (2013.01); *H04J 14/0307* (2023.08)

(58) Field of Classification Search
CPC ............ H04B 10/07953; H04J 14/0221; H04J 14/0307
See application file for complete search history.

(56) References Cited

U.S. PATENT DOCUMENTS

| | | | | | |
|---|---|---|---|---|---|
| 7,633,674 | B2 * | 12/2009 | Laham | H01S 5/4025 359/344 |
| 2003/0099013 | A1 * | 5/2003 | Su | G02B 6/29358 398/79 |
| 2013/0142510 | A1 * | 6/2013 | Zhou | H04J 14/0208 398/48 |
| 2019/0094466 | A1 * | 3/2019 | Beausoleil | H04B 10/506 |
| 2020/0403706 | A1 | 12/2020 | Xie | |
| 2021/0181310 | A1 * | 6/2021 | Lu | G01S 7/4818 |
| 2022/0206357 | A1 * | 6/2022 | Wang | G02F 1/3137 |

* cited by examiner

*Primary Examiner* — David C Payne
(74) *Attorney, Agent, or Firm* — Patterson + Sheridan, LLP

(57) ABSTRACT

A filter circuitry includes a first multi-mode interferometer (MMI) circuitry receives an optical input signal and generates a first output optical signal and a second output optical signal according to a first power splitting ratio. A second MMI circuitry receives the first output optical signal and the second output optical signal and generates a third output optical signal and a fourth output optical signal according to a second power splitting ratio. A third MMI circuitry receives the third output optical signal and the fourth output optical signal and generates a fifth output optical signal and a sixth output optical signal according to the second power splitting ratio. A fourth MMI circuitry receives the fourth output optical signal and the fifth output optical signal and generates a seventh output optical signal and an eighth output optical signal according to a third power splitting ratio, with each power splitting ratio being different.

20 Claims, 6 Drawing Sheets

ROBUST FLAT-TOP OPTICAL FILTER DESIGN UTILIZING PHASE AND POWER SPLITTING RATIO OF MMI COUPLERS

TECHNICAL FIELD

An embodiment relates to Wavelength-Division Multiplexing (WDM) circuitry. In particular, embodiments herein relate to a flat-top filter circuitry.

BACKGROUND

Wavelength-Division Multiplexing (WDM) technology has garnered significant attention as a promising solution to augment link capacity in data communication systems. WDM technology enables the transmission of multiple independent signals at different wavelengths, thereby expanding the bandwidth several times over. In recent years, there has been a substantial development of WDM circuitries on the silicon platform, attributed to the ultra-high index contrast and mature fabrication technology of silicon waveguides. However, one of the challenges for silicon WDM circuitries is wavelength drift, which arises from thermal sensitivity and fabrication-induced non-uniformity of silicon waveguides. This drift necessitates wavelength trimming and tuning to ensure wavelength alignment. Nonetheless, this tolerance can be achieved by designing an optical transceiver circuitry including an filter circuitry that provides flat transmission passbands. Flat transmission passbands with a high extinction ratio and low insertion loss can be beneficial in achieving wavelength tolerance by reducing the variation in the transmission spectrum, thereby improving the reliability and performance of WDM devices and systems.

However, conventional filter circuitries require thermal tuning or multiple phase shifters to generate supplemental phase shifts between optical signals output by the filter circuitry, which consumes additional power resources. Furthermore conventional filter circuitries may also require the use of directional couplers that are sensitive to variation in the fabrication process while leading to a signification reduction in circuitry yield and overall performance reliability.

SUMMARY

According to one or more examples, a filter circuitry includes a first multi-mode interferometer (MMI) circuitry configured to receive an optical input signal and generate a first output optical signal and a second output optical signal according to a first power splitting ratio, a second MMI circuitry configured to receive the first output optical signal and the second output optical signal and generate a third output optical signal and a fourth output optical signal according to a second power splitting ratio, a third MMI circuitry configured to receive the third output optical signal and the fourth output optical signal and generate a fifth output optical signal and a sixth output optical signal according to the second power splitting ratio, and a fourth MMI circuitry configured to receive the fourth output optical signal and the fifth output optical signal and generate a seventh output optical signal and an eighth output optical signal according to a third power splitting ratio, wherein the first power splitting ratio, the second power splitting ratio, and the third power splitting ratio are different.

According to one or more examples, an optical transceiver circuitry includes an optical input source circuitry, and an optical de-interleaver circuitry configured to receive an optical input signal from the optical input source circuitry and provide separated optical signals to a micro-ring modulator (MRM) array circuitry, the optical de-interleaver circuitry comprising a first filter circuitry including a first multi-mode interferometer (MMI) circuitry configured to receive the optical input signal and generate a first output optical signal and a second output optical signal according to a first power splitting ratio, and a second MMI circuitry configured to receive the first output optical signal and the second output optical signal and generate a third output optical signal and a fourth output optical signal according to a second power splitting ratio.

According to one or more examples, a method includes receiving, by a filter circuitry, an optical input signal of the filter circuitry, generating, by a first multi-mode interferometer (MMI) circuitry of the filter circuitry, a first output optical signal and a second output optical signal of the filter circuitry according to a first power splitting ratio, generating, by a second MMI circuitry of the filter circuitry, a third output optical signal and a fourth output optical signal according to a second power splitting ratio, generating, by a third MMI circuitry of the filter circuitry, a fifth output optical signal and a sixth output optical signal according to the second power splitting ratio, and generating, by a fourth MMI circuitry of the filter circuitry, a seventh output optical signal and a eighth output optical signal according to a third power splitting ratio, wherein the first power splitting ratio, the second power splitting ratio, and the third power splitting ratio are different.

DETAILED DESCRIPTION

Filter circuitries with flat transmission passbands may be used in optical transceiver circuitries to account for wavelength drift, which arises from thermal sensitivity and fabrication-induced non-uniformity of silicon waveguides. However, conventional filter circuitries require thermal tuning or multiple phase shifters to generate the required phase shifts between optical signals output by the filter circuitry, which consumes additional power resources, and/or require the use of directional couplers that are sensitive to variation in the fabrication process which leads to a signification reduction in circuitry yield and overall performance reliability.

Embodiments herein relate to an optical de-interleaver circuitry including a filter circuitry that generates separated optical signals (with flat transmissive passbands) using passive circuitry components and without requiring any supplemental phase adjustments, thus improving the reliability and power consumption (performance) of the optical transceiver circuitry.

Figure 1:
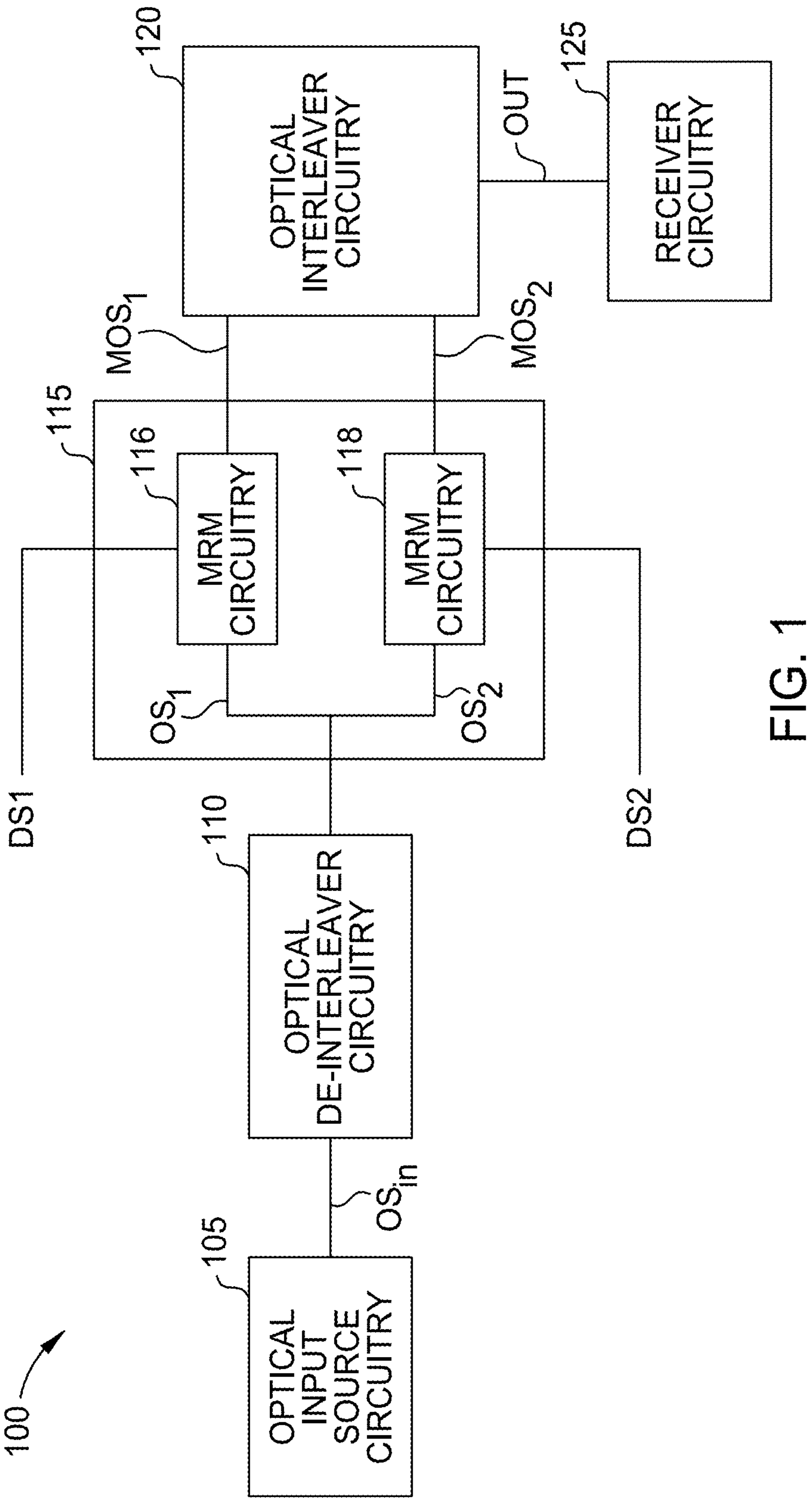
FIG. 1 is a block diagram of an example optical transceiver circuitry 100, in accordance with one or more examples.

FIG. 1 is a block diagram of an example optical transceiver circuitry 100, in accordance with one or more examples. The optical transceiver circuitry 100 includes an optical input source circuitry 105, an optical de-interleaver circuitry 110, an micro-ring modulator (MRM) array circuitry 115, an optical interleaver circuitry 120, and a receiver circuitry 125. Although only one optical de-interleaver circuitry 110, MRM array circuitry 115, and optical interleaver circuitry 120 are illustrated, this is for example purposes only. It is understood that multiple optical de-interleaver circuitries, MRM array circuitries, and optical interleaver circuitries may be used. Furthermore, although only one level (i.e. stage circuitry) of optical de-interleaver circuitries and optical interleaver circuitries are shown, this is also for example purposes only and multiple stage circuitries of optical de-interleaver circuitries and optical interleaver circuitries may be used.

The optical input source circuitry 105 is configured to provide an optical input signal OSin to the optical de-interleaver circuitry 110. In one or more examples, the optical input signal OSin includes a stream of data. The optical input source circuitry 105 provides the optical input signal OSin that includes a plurality optical wavelengths upon which a corresponding plurality of data streams are modulated. In accordance with various aspects of the present disclosure, the optical transceiver circuitry 100 is configured to encode optical signals on each of the optical wavelengths of the optical input signal OSin with data associated with a corresponding data stream. Each of the optical channels associated with the optical input signal OSin is characterized by a distinct wavelength, and are spaced from adjacent optical channels by certain channel spacing.

The optical de-interleaver circuitry 110 includes an optical input to receive the optical input signal OSin and an optical output coupled to the MRM array circuitry 115. In an example operation, the optical de-interleaver circuitry 110 separates the received optical input signal OSin to generate separated optical signals, such as a first separated optical signal OS1 and a second separated optical signal OS2. Stated otherwise, the optical de-interleaver circuitry 110 is a two-channel optical de-interleaver circuitry. Although a two-channel optical de-interleaver circuitry 110 is shown, this is for example purposes only. The optical de-interleaver circuitry 110 includes any suitable quantity of channels such as 4 channels, 6 channels, 8 channels, and so on. The optical de-interleaver circuitry 110 increases the channel spacing of the optical signal OSin. In one example, by separating the optical input signal OSin into two separate optical signals, the channel spacing of the optical input signal OSin may be doubled.

The MRM array circuitry 115 includes an optical output coupled to the optical de-interleaver circuitry 110. In one or more examples, the MRM array circuitry 115 includes a plurality of MRM circuitries that each comprise a plurality of micro-ring modulators (not shown for simplicity) configured to modulate an associated optical signal with data from a corresponding data stream. The micro-ring modulators may be silicon-based optical devices that can modulate an optical channel (e.g., a specific wavelength of light) with data from a corresponding data stream. In one example, the MRM array circuitry 115 includes a first MRM circuitry 116 and a second MRM circuitry 118. The quantity of MRM circuitries in the MRM array circuitry 115 is not limited.

As depicted in FIG. 1, a first data stream set DS1 is provided to the first MRM circuitry 116. A second data stream set DS2 is provided to the second MRM circuitry 118. Each data stream set includes a unique data stream. The first MRM circuitry 116 receives the first separated optical signal OS1 and the first data set DS1. The second MRM circuitry 118 receives the second separated optical signal OS2 and the second data stream set DS2. Each of the plurality of micro-ring modulators modulate the corresponding separated optical signal with the corresponding data set to form modulated optical signals. For example, the plurality of micro-ring modulators of the first MRM circuitry 116 modulate the first separated optical signal OS1 with the first data set DS1, generating a first modulated optical signal MOS1. The plurality of micro-ring modulators of the second MRM circuitry 118 modulate the second separated optical signal OS2 with the second data set DS2, generating a second modulated optical signal MOS2. In one or more examples, the first separated optical signal OS1 and the second separated optical signal OS2 are wavelength division and multiplexing (WDM) optical streams. The first modulated optical signal MOS1 and the second modulated optical signal MOS2 are provided to an optical interleaver circuitry 120. The optical interleaver circuitry 120 combines the first modulated optical signal MOS1 and the second modulated optical signal MOS2 to generate an optical output signal OUT, which is provided to the receiver circuitry 125.

However, conventional optical de-interleaver circuitries may be susceptible to wavelength drift, which arises from thermal sensitivity and fabrication-induced non-uniformity of silicon waveguides. This drift necessitates wavelength trimming and tuning to ensure wavelength alignment. Embodiments herein relate to an optical channel de-interleaver that generates separated optical signals (i.e., the first and second optical signals) with flat transmissive passbands. The separated optical signals advantageously have a high extinction ratio and low insertion loss which is beneficial in achieving wavelength tolerance by reducing the variation in the transmission spectrum, thereby improving the reliability and performance of the optical transceiver circuitry 100.

Figure 2:
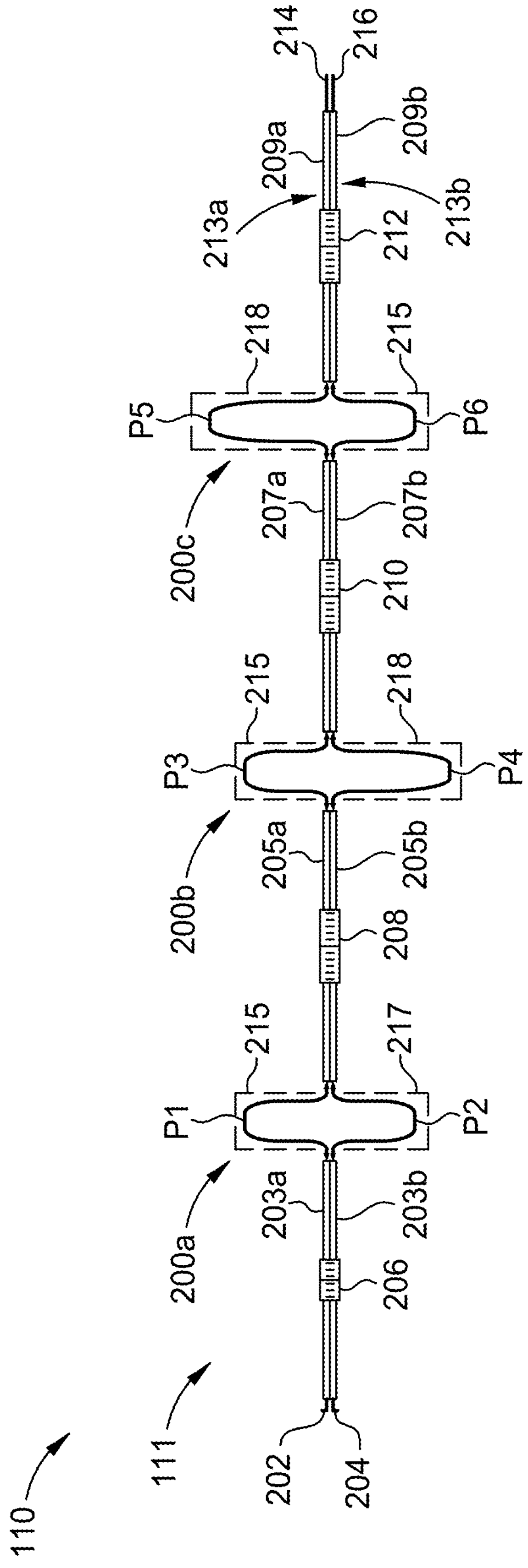
FIG. 2 is a schematic diagram of an optical de-interleaver circuitry, in accordance with one or more examples.

FIG. 2 is a schematic diagram of an optical de-interleaver circuitry 110, in accordance with one or more examples. In one or more examples, the optical de-interleaver circuitry 110 includes a filter circuitry 111. In one or more examples, the filter circuitry 111 is an optical waveguide, such as a silicon (Si) waveguide, a silicon-on-insulator (SOI) waveguide, or the like. In one or more examples, the filter circuitry 111 includes an optical input 202, an optical input 204, a stage circuitry 200*a*, a stage circuitry 200*b*, a stage circuitry 200*c*, an optical output 214, and an optical output 216. The filter circuitry 111 includes two or more channels. In one more examples, the filter circuitry 111 includes a channel 213*a* and a channel 213*b*. Even though a two-channel filter circuitry 111 is described herein, this is for example purposes only. It is understood that any suitable quantity of channels may be included in the filter circuitry 111. It is further understood, that the number of optical outputs included in the filter circuitry 111 are equal to the quantity of channels.

The stage circuitry 200*a* creates an optical signal path P1 and an optical signal path P2 with optical signal path lengths that are different from one another. The stage circuitry 200*b* creates an optical signal path P3 and an optical signal path P4 with optical signal path lengths that are different from one another. The stage circuitry 200*c* creates an optical signal path P5 and an optical signal path P6 with optical signal path lengths that are different from one another. In one or more examples, the filter circuitry 111 further includes multi-mode interferometer (MMI) circuitries disposed at the input and outputs of each of the optical signal paths. A MMI circuitry 206 is disposed between the optical inputs and the stage circuitry 200*a*. A MMI circuitry 208 is disposed between the stage circuitry 200*a* and the stage circuitry 200*b*. A MMI circuitry 210 is disposed between the stage circuitry 200*b* and the stage circuitry 200*c*. A MMI circuitry 212 is disposed between the stage circuitry 200*c* and the optical outputs.

As will be described in more detail below, the filter circuitry 111 functions as a flat-top filter circuitry (i.e., provides a flat transmissive passband). The multiple MMI circuitries and optical signal paths split the received input optical signal OSin into two different channels with different power ratios and phase shifts (caused by the MMI circuitries) and delays (caused by the difference in optical distances between corresponding optical signal paths). Stated otherwise, the filter circuitry 111 receives the optical input signal OSin via the optical input 202, and outputs the first separated optical signal OS1 via the channel 213*b* (i.e., the optical output 214) and outputs the second separated optical signal OS2 via the channel 213*b* (i.e., the optical output 216). The filter circuitry 111 ensures that the first separated optical signal OS1 and the second separated optical signal OS2 are not passed through the same output channel. The optical de-interleaver circuitry 110 also ensures that the separated optical signal being passed with have will have a flat-top shape (i.e. remain flat across a bandwidth while the power is at least −1 dB) while the other separated optical signal is less than or equal to −20 dB, improving cross-talk between the two channels. This will be described in more detail below.

In one or more examples, the MMI circuitry 206 is a symmetric MMI circuitry, the MMI circuitry 208 and the MMI circuitry 210 are asymmetric MMI circuitries, and the MMI circuitry 212 is a double asymmetric MMI circuitry. In one or more examples, the MMI circuitry 208 and the MMI circuitry 210 are configured the same. Advantageously, each of the MMI circuitries are optical waveguides that combine the optical signals, and split (or re-split) the combined optical signal into two separate optical signals with different phase shifts and/or power ratios that are provided to the channel 213*a* and the channel 213*b*. Therefore, additional circuitry, which consumes additional power, is not required to generate phase shifts on the respective signals on the channel 213*a* and the channel 213*b*. This will be described in more detail below.

Figure 3A:
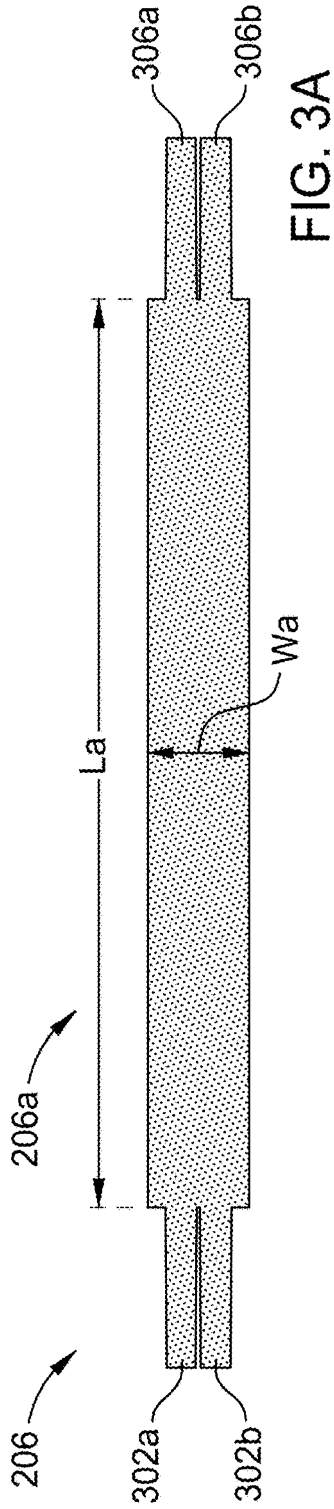
FIG. 3A is a schematic diagram of a symmetric MMI circuitry in accordance with one or more examples.

Referring back to FIG. 2, the optical input 202 is coupled to the optical input source circuitry 105 (FIG. 1) and the optical input 204 is not coupled to any input signal. FIG. 3A is a schematic diagram of a symmetric MMI circuitry (i.e., the MMI circuitry 206), in accordance with one or more examples. Referring to FIG. 3A, the MMI circuitry 206 includes an input 302*a*, an input 302*b*, an output 306*a*, and an output 306*b*. The input 302*a* receives the optical input signal OSin. The input 302*b* does not receive an input signal. As noted above, in one or more examples, the MMI circuitry 206 is a symmetric MMI circuitry. The MMI circuitry 206 includes a MMI circuitry body 206*a*. The MMI circuitry body 206*a* has a length La. Because the MMI circuitry 206 is a symmetric MMI circuitry, the MMI circuitry body 206*a* has a constant width Wa across the entire length La. In one or more examples, the length La is from about 30 μm to about 60 μm and the width Wa is from about 2 μm to about 5 μm.

In one or more examples, because the MMI circuitry 206 is symmetric and is only receiving the optical input signal OSin at the input 302*a*, the MMI circuitry 206 splits the power of the optical input signal OSin evenly using a first power splitting ratio. The MMI circuitry 206 splits the optical input signal OSin into an output optical signal 203*a* and an output optical signal 203*b*. As noted above, the MMI circuitry 206 is designed in a manner such that the powers of the output optical signal 203*a* and the output optical signal 203*b* are both equal to half of the power of the optical input signal OSin. Stated otherwise, the first power splitting ratio is 1:1. The MMI circuitry 206 also inherently adds a phase shift to the output optical signal 203*a* and the output optical signal 203*b*. The output optical signal 203*a* includes a first phase shift, and the output optical signal 203*b* includes a second phase shift. In one example, the first phase shift is from about 200° to about 270° and the second phase shift is from about 110° to about 180°. In one or more examples, the phase shift between the optical outputs of the MMI circuitries (e.g., MMI circuitries 206-212) is due to the multimode interference that occurs within the MMI circuitries, the mode propagation constants of each MMI circuitry, the length and width of the MMI circuitry bodies of each MMI circuitry (e.g., the MMI circuitry body 206*a* of the MMI circuitry 206), and the input conditions. Advantageously, these parameters (e.g., the length La and the width Wa of the MMI circuitry body 206*a*) can be designed so that specific phase relationships can be achieved.

The output optical signal 203*a* and the output optical signal 203*b* are then provided to the stage circuitry 200*a*. As noted above, the stage circuitry 200*a* creates the optical signal path P1 and the optical signal path P2. The optical signal path P1 has an optical signal path length 215. The optical signal path P2 has an optical signal path length 217. In one or more examples, the optical signal path length 215 is equal to X, where X is a length between 1 μm and 500 μm. The optical signal path length 217 is equal to X plus ΔX, where ΔX is equal to the difference in length between the optical signal path length 215 and the optical signal path length 217. Stated differently, the stage circuitry 200*a* delays the output optical signal 203*b* from the output optical signal 203*a*. In one or more examples, ΔX is determined based on the channel spacing of the optical de-interleaver circuitry 110, the group index of the optical de-interleaver circuitry 110, and the wavelength of light being output by the optical input source circuitry 105. In one or more examples, ΔX is determined using Eq.1 shown below:

$$\Delta X = \frac{\lambda^2}{FSR * n_g} \quad \text{(Eq. 1)}$$

where λ represents the wavelength of light being passed through the filter circuitry 111 and $n_g$ represents the group index of the filter circuitry 111, and FSR represents the free spectral range of the filter circuitry 111.

After passing through the stage circuitry 200*a*, the output optical signal 203*a* and the output optical signal 203*b* are provided to the MMI circuitry 208.

Figure 3B:
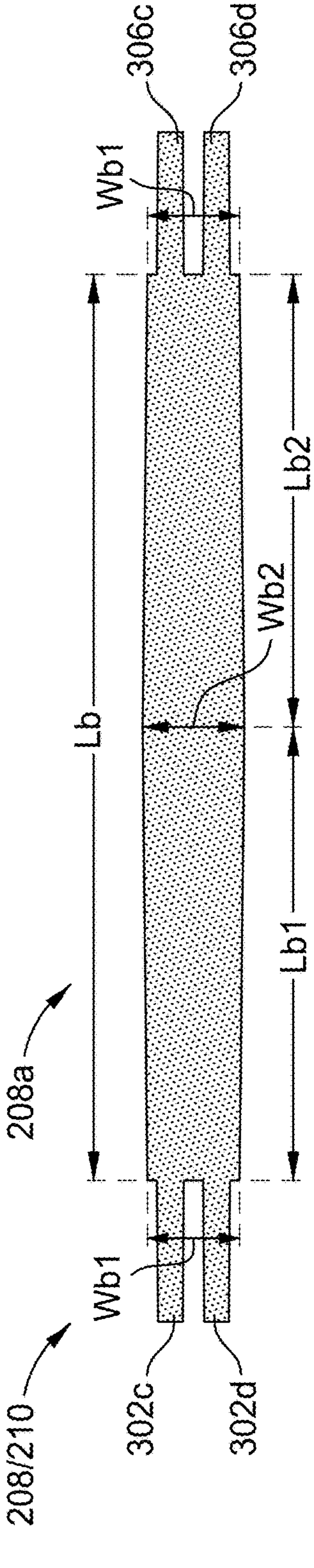
FIG. 3B is a schematic diagram of an asymmetric MMI circuitry in accordance with one or more examples.

FIG. 3B is a schematic diagram of an asymmetric MMI circuitry (i.e., the MMI circuitry 208 and the MMI circuitry 210), in accordance with one or more examples. Referring to FIG. 3B, the MMI circuitry 208 includes an input 302*c*, an input 302*d*, an output 306*c*, and an output 306*d*. As noted above, the quantity of inputs and is equal to the quantity of channels. The input 302*c* receives the output optical signal 203*a*. The input 302*d* receives the output optical signal 203*b*. As noted above, in one or more examples, the MMI circuitry 208 is an asymmetric MMI circuitry. The MMI circuitry 208 includes a MMI circuitry body 208*a*. The MMI circuitry body 208*a* has a length Lb. In one or more examples, the length Lb is equal to a sub-length Lb1 plus a sub-length Lb2. Stated otherwise, the length Lb of the MMI circuitry body 208*a* includes both the sub-length Lb1 and the sub-length Lb2. In one or more examples, the first sub-length Lb1 and the second sub-length Lb2 are equal, and are therefore, equal to half of the length Lb. Because the MMI circuitry 208 is an asymmetric MMI circuitry, the MMI circuitry body 208*a* has an increasing width across the sub-length Lb1 and a decreasing width across the sub-length Lb2. The MMI circuitry body 208*a* initially begins with a width Wb1 and increases in width across the sub-length Lb1 until a width Wb2 is reached. The width of the MMI circuitry body 208*a* then decreases in width across the sub-length Lb2 until the width of the MMI circuitry body 208*a* returns to the width Wb1. In one or more examples, the length Lb is from about 50 μm to about 90 μm and the width Wb1 is from about 2 μm to about 4 μm, and the width Wb2 is from about 3 μm to about 6 μm.

In one or more examples, because the MMI circuitry 208, is asymmetric, the MMI circuitry 208 re-combines the output optical signal 203*a* and the output optical signal 203*b* to form a first re-combined optical signal and then splits the power of the first re-combined optical signal unevenly according to a second power splitting ratio. The MMI circuitry 208 provides an output optical signal 205*a* to the output 306*c* and an output optical signal 205*b* to the output 306*d*. In one or more examples, the second power splitting ratio is from about 1:4 to about 3:7. In one example, a 1:4 ratio indicates that the output optical signal 205*a* includes about 20% of the power of the first re-combined optical signal and the output optical signal 205*b* includes about 80% of the power of the first re-combined optical signal. In another example, a 3:7 ratio indicates that the output optical signal 205*a* includes about 30% of the power of the first re-combined optical signal and the output optical signal 205*b* includes about 70% of the power of the first re-combined optical signal.

Furthermore, in the same manner described above, the output optical signal 205*a* includes the first phase shift, and the output optical signal 205*b* includes the second phase shift that is inherently caused by use of an MMI circuitry. As noted above, the first phase shift is from about 200° to about 270° and the second phase shift is from about 110° to about 180°.

The output optical signal 205*a* and the output optical signal 205*b* are then provided to the stage circuitry 200*b*. As noted above, the stage circuitry 200*b* creates the optical signal path P3 and the optical signal path P4. The optical signal path P3 has the optical signal path length 215. The optical signal path P4 has an optical signal path length 218. In one or more examples, the optical signal path length 218 is equal to the length of the optical signal path length 215 plus two-times ΔX (i.e., X plus two-times ΔX). Stated differently, the stage circuitry 200*b* delays the output optical signal 205*b* from the output optical signal 205*a*.

After passing through the stage circuitry 200*b*, the output optical signal 205*a* and the output optical signal 205*b* are provided to the MMI circuitry 210. In one or more examples, the MMI circuitry 210 is configured the same as the MMI circuitry 208. The MMI circuitry 210 re-combines the output optical signal 205*a* and the output optical signal 205*b* into a second re-combined optical signal. The MMI circuitry 210 splits the second re-combined optical signal into an output optical signal 207*a* and output optical signal 207*b* according to the second power splitting ratio. In one example, a 1:4 ratio indicates that the output optical signal 207*a* includes about 20% of the power of the second re-combined optical signal and the output optical signal 207*b* includes about 80% of the power of the second re-combined optical signal. In another example, a 3:7 ratio indicates that the output optical signal 207*a* includes about 30% of the power of the second re-combined optical signal and the output optical signal 207*b* includes about 70% of the power of the second re-combined optical signal.

Furthermore, in the same manner described above, the output optical signal 207*a* includes the first phase shift, and the output optical signal 207*b* includes the second phase shift.

The output optical signal 207*a* and the output optical signal 207*b* are then provided to the stage circuitry 200*c*. As noted above the stage circuitry 200*c* creates the optical signal path P5 and the optical signal path P6. The optical signal path P5 has the optical signal path length 218. The optical signal path P6 has the optical signal path length 215. In one or more examples, the optical signal path length 218 is equal to the length of the optical signal path length 215 plus two-times ΔX (i.e., X plus two-times ΔX). Stated differently, the stage circuitry 200*c* delays the output optical signal 205*b* from the output optical signal 205*a*.

After passing through the stage circuitry 200*c*, the output optical signal 207*a* and the output optical signal 207*b* are provided to the MMI circuitry 212.

Figure 3C:
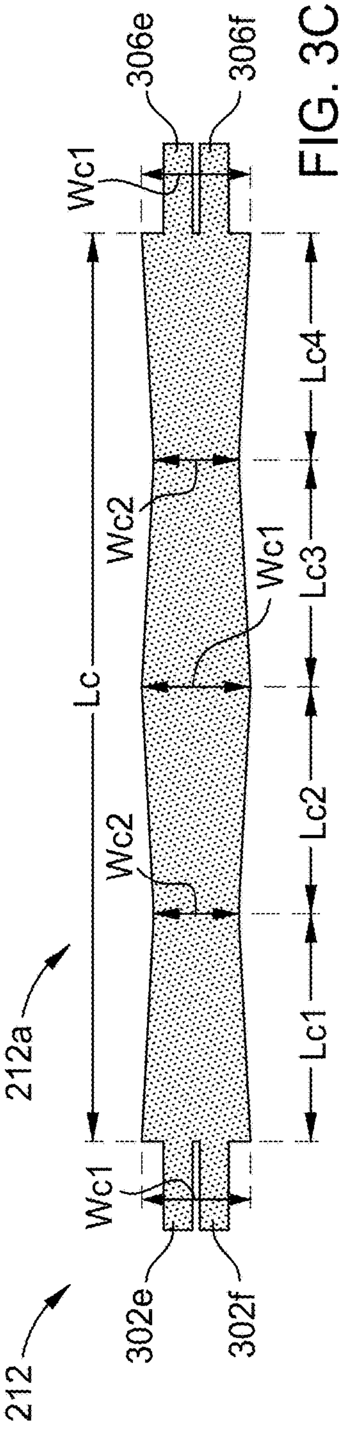
FIG. 3C is a schematic diagram of a double asymmetric MMI circuitry in accordance with one or more examples.

FIG. 3C is a schematic diagram of a double asymmetric MMI circuitry (i.e., the MMI circuitry 212), in accordance with one or more examples. Referring to FIG. 3C, the MMI circuitry 212 includes an input 302*e*, an input 302*f*, an output 306*e*, and an output 306*f*. As noted above, the quantity of inputs and outputs is equal to the quantity of channels. The input 302*e* receives the output optical signal 207*a*. The input 302*f* receives the output optical signal 207*b*. As noted above, in one or more examples, the MMI circuitry 212 is a double asymmetric MMI circuitry. The MMI circuitry 212 includes a MMI circuitry body 212*a*. The MMI circuitry body 212*a* has a length Lc. In one or more examples, the length Lc is equal to a sum of a sub-length Lc1, a sub-length Lc2, a sub-length Lc3, and a sub-length Lc4. Stated otherwise, the length Lc of the MMI circuitry body 212*a* includes the sub-lengths Lc1-Lc4. In one or more examples, the sub-lengths Lc1-Lc4 re equal. Therefore, the sub-lengths Lc1-Lc4 are equal to a quarter of the length Lc. Because the MMI circuitry 212 is a double asymmetric MMI circuitry, the MMI circuitry body 212*a* has increasing width across the sub-length Lc2 and the sub-length Lc4 and a decreasing width across the sub-length Lc1 and the sub-length Lc3. The MMI circuitry body 212*a* initially begins with a width Wc1 and decreases in width across the sub-length Lc1 until a width Wc2 is reached. The width of the MMI circuitry body 212*a* increases in width across the sub-length Lc2 until the width of the circuitry body returns to the width Wc1. The width of the MMI circuitry body 212*a* decreases in width across the sub-length Lc3 until the width of the circuitry body returns to the width Wc2. The width of the MMI circuitry body 212*a* increases in width across the sub-length Lc4 until the width of the circuitry body returns to the width Wc1. In one or more examples, the length Lc is from about 50 μm to about 80 μm, the width Wc1 is from about 3 μm to about 6 μm, and the width Wc2 is from about 3 μm to about 6 μm.

In one or more examples, because the MMI circuitry 212 is double asymmetric, the MMI circuitry 212 re-combines the output optical signal 207*a* and the output optical signal 207*b* to form a third re-combined optical signal and then splits the power of the third re-combined optical signal unevenly according to a third power splitting ratio. The MMI circuitry 212 splits the third re-combined optical signal into an output optical signal 209*a* and an output optical signal 209*b* according to the third power ratio. In one or more examples, if the filter circuitry 111 is a two-channel filter, the output optical signal 209*a* and the output optical signal 209*b* correspond to the first separated optical signal OS1 and the second separated optical signal OS2. The output optical signal 209*a* and the output optical signal 209*b* are provided to the first MRM circuitry 116 and the second MRM circuitry 118, respectively, via the optical output 214 and the optical output 216, respectively. In one or more examples, the third power splitting ratio is from about 1:24 to about 2:23. For example, a 1:24 ratio indicates that the output optical signal 209*a* includes about 4% of the power of the third re-combined optical signal and the output optical signal 209*b* includes about 96% of the power of the third re-combined optical signal.

The MMI circuitry 212 also inherently adds a phase shift to the output optical signal 209*a* and the output optical signal 209*b*. The output optical signal 209*a* includes the first phase shift, and the output optical signal 209*b* includes a third phase shift. In one example, the third phase shift is equal 290-360°.

Figure 4:
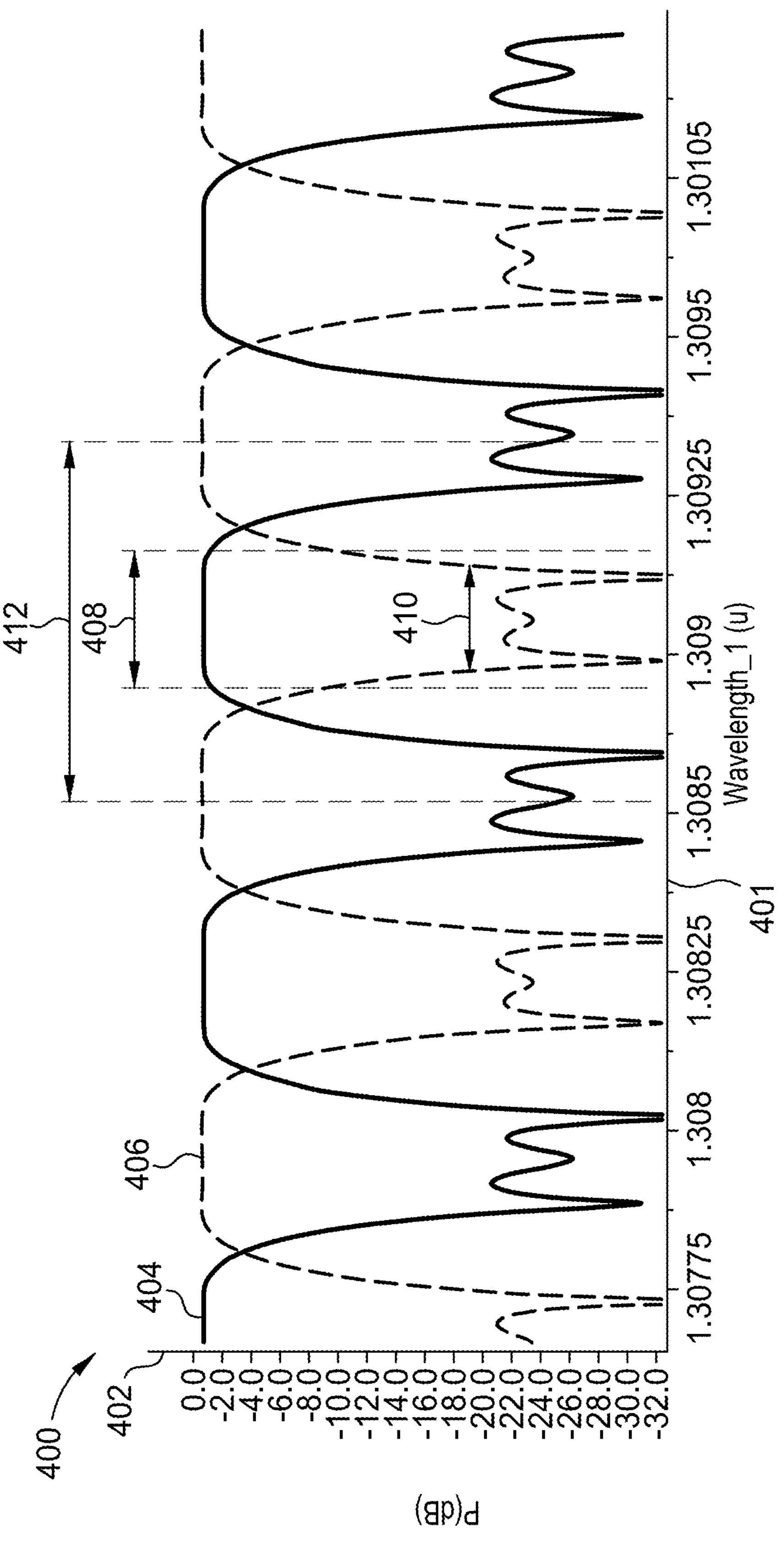
FIG. 4 illustrates a graph plotting the power of the first separated optical signal and the second separated optical signal, according to one or more examples.

FIG. 4 illustrates a graph 400 plotting the power of the first separated optical signal OS1 and the second separated optical signal OS2, according to one or more examples. Graph 400 includes a horizontal axis 401 and a vertical axis 402. The horizontal axis 401 plots a change in wavelength of the first separated optical signal OS1 and the second separated optical signal OS2. The change in wavelength increases from left-to-right. The vertical axis 402 plots a change in power in of the first separated optical signal OS1 and the second separated optical signal OS2. The change in power decreases from top to bottom.

As noted above, graph 400 includes the first separated optical signal OS1 and the second separated optical signal OS2. The first separated optical signal OS1 is illustrated as first line 404. The second separated optical signal OS2 is illustrated as a second line 406. As noted above the filter circuitry 111 causes from only one of the separated optical signals to be passed at a time. For example while the first line 404 reaches a power of −1 dB, the second line is at power less than or equal to −20 dB (and vice versa). In addition, while either of the separated optical signals is being passed, separated optical signal or signals include a flat-top shape. For example, as each time the first line 404 (the first separated signal OS1) or the second line 406 (the second separated optical signal OS2) reaches −1 dB it remains there for a first bandwidth 408 ranging from about 0.4 nm to about 0.5 nm, for example 0.47 nm. Stated otherwise, the first separate optical signal OS1 and the second separate optical signal OS2 have a 1 dB bandwidth equal to the first bandwidth 408. Concurrently, while one separated optical signal is being passed, the other optical signal is not being passed, and therefore, has a power less than or equal to −20 dB. For example, while the first line 404 has a power of −1 dB, the second line 406 surpasses a power of −20 dB (i.e., the extinction ratio surpasses 20 dB) for a second bandwidth 410 from about 0.3 nm to about 0.4 nm, for example 0.335 nm (and vice versa). Stated otherwise, the first separate optical signal OS1 and the second separate optical signal OS2 have a crosstalk bandwidth equal to the second bandwidth 410. The first line 404 and the second line 406 also have a free spectral range (FSR) 412 between 1 nm and 1.5 nm for example 1.14 nm. Advantageously, the filter generates a flat-top response with an improved 1 dB bandwidth, an improved (increased) cross-talk bandwidth, and an increased insertion loss.

Figure 5:
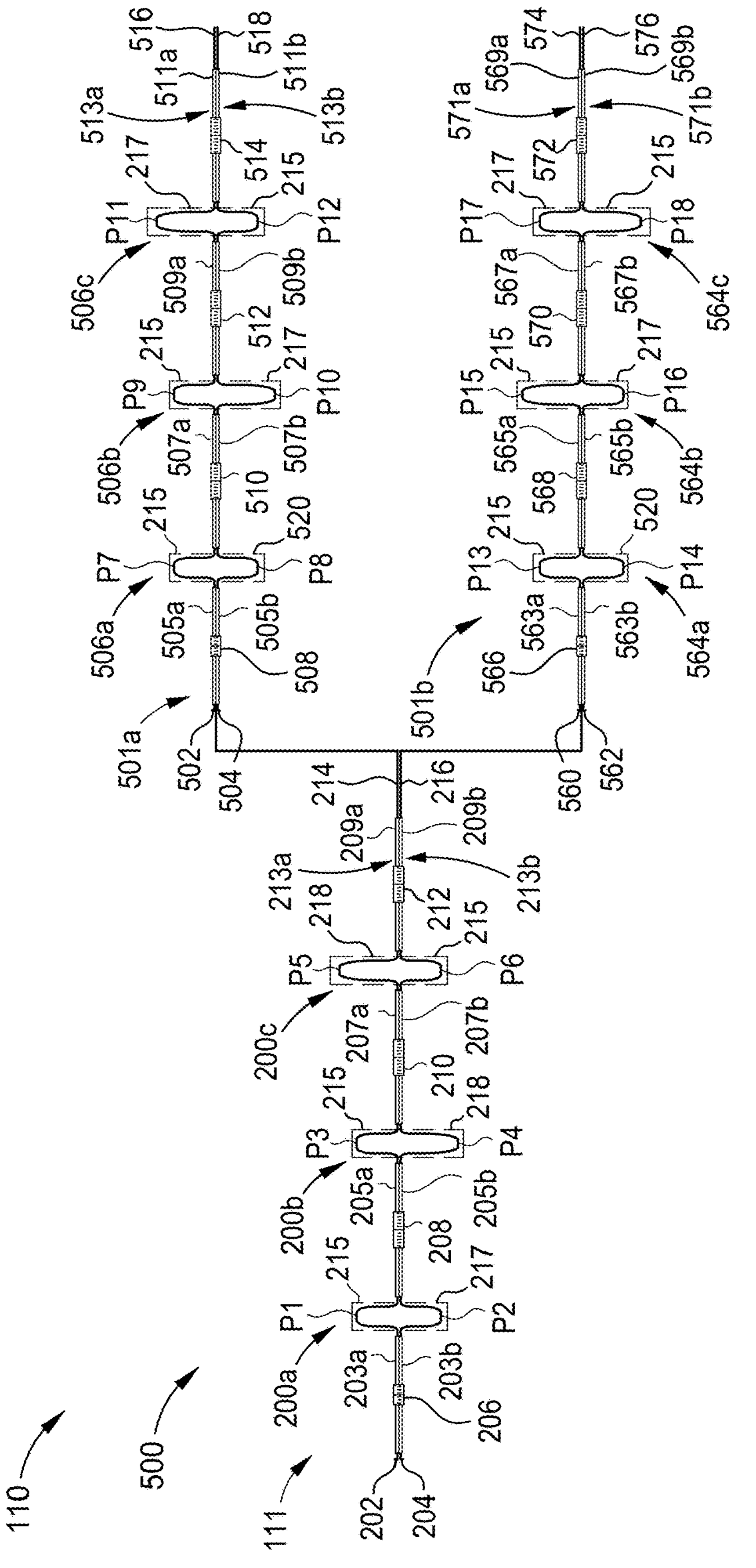
FIG. 5 illustrates a filter circuitry that includes four channels in accordance with one or more examples.

In one or more examples, as described above, the optical de-interleaver circuitry 110 includes a filter circuitry that includes more than two channels. FIG. 5 illustrates a filter circuitry 500 that includes four channels (i.e., four optical outputs) in accordance with one or more examples. In one or more examples, the filter circuitry 500 includes the filter circuitry 111 that is coupled in cascade to a filter circuitry 501*a* and a filter circuitry 501*b*. In one or more examples, the filter circuitry 501*a* and the filter circuitry 501*b* are two-channel filter circuitries.

Therefore, in this example, the optical de-interleaver circuitry 110 outputs four separated output signals. As noted above, the quantity of MRM circuitries included in the MRM array circuitry 115 is equal to the quantity of outputs of the optical de-interleaver circuitry (i.e., channels included in the filter circuitry 500). Therefore, in this example, the MRM array circuitry 115 includes (but is not limited to) 4 MRM circuitries that receive each a separated optical output signal provided by the optical de-interleaver circuitry 110. For example, the optical de-interleaver circuitry 110 outputs the first separated optical signal OS1 to the first MRM circuitry 116, the second separated optical signal OS2 to the second MRM circuitry 118, a third separated optical signal to a third MRM circuitry (not shown), a fourth separated optical signal to a fourth MRM circuitry (not shown). In one or more examples, the optical output 214 is coupled to the filter circuitry 501*a*. The optical output 216 is coupled to the filter circuitry 501*b*.

In one or more examples, the filter circuitry 501*a* includes an optical input 502, an optical input 504, a stage circuitry 506*a*, a stage circuitry 506*b*, a stage circuitry 506*c*, an optical output 516, and an optical output 518. The filter circuitry 501*a* includes two or more channels. In one more examples, the filter circuitry 501*a* includes a channel 513*a* and a channel 513*b*. Even though a two-channel filter circuitry 501*a* is described herein, this is for example purposes only. It is understood that any suitable quantity of channels may be included in the filter circuitry 501*a*. It is further understood, that the number of inputs and outputs included in the filter circuitry 501*a* are equal to the quantity of channels.

The stage circuitry 506*a* creates an optical signal path P7 and an optical signal path P8 with optical signal path lengths that are different from one another. The stage circuitry 506*b* creates an optical signal path P9 and an optical signal path P10 with optical signal path lengths that are different from one another. The stage circuitry 506*c* creates an optical signal path P11 and an optical signal path P12 with optical signal path lengths that are different from one another. In one or more examples, the filter circuitry 501*a* further includes multi-mode interferometer (MMI) circuitries disposed at the input and outputs of each of the optical signal paths. A MMI circuitry 508 is disposed between the inputs and the stage circuitry 506*a*. A MMI circuitry 510 is disposed between the stage circuitry 506*a* and the stage circuitry 506*b*. A MMI circuitry 512 is disposed between the stage circuitry 506*b* and the stage circuitry 506*c*. A MMI circuitry 514 is disposed between the stage circuitry 506*c* and the optical outputs.

The filter circuitry 501*a* receives the output optical signal 209*a*, and outputs the first separated optical signal OS1 via the channel 513*a* (i.e., the optical output 516) and outputs the second separated optical signal OS2 via the channel 513*b* (i.e., the optical output 518).

In the same manner described above, the filter circuitry 500 functions as a flat-top filter. The multiple MMI circuitries and optical signal paths split the received output optical signal 209*a* into two different channels with different power ratios and phase shifts (caused by the MMI circuitries) and delays (caused by the difference is optical distances between corresponding optical signal paths).

In one or more examples, the MMI circuitry 508 is a symmetric MMI circuitry, the MMI circuitry 510 and the MMI circuitry 512 are asymmetric MMI circuitries, and the MMI circuitry 514 is a double asymmetric MMI circuitry. Advantageously, each of the MMI circuitries are optical waveguides that combine received optical signals, and split (or re-split) the received optical signal into two separate optical signals with different phase shifts and/or power ratios that are provided to the channel 513*a* and the channel 513*b*. Therefore, additional circuitry, which consumes additional power, is not required to generate phase shifts on the respective optical signals on the channel 513*a* and the channel 513*b*.

Referring back to FIG. 5, the optical input 504 is coupled to the optical output 214. The optical input 502 is not coupled to an input signal.

In one or more examples, the MMI circuitry 508 and the MMI circuitry 206 are the same. In one or more examples, because the MMI circuitry 508 is symmetric and is only receiving the output optical signal 209*a*, the MMI circuitry 508 splits the power of the output optical signal 209*a* evenly using the first power splitting ratio. The MMI circuitry 508 splits the output optical signal 209*a* into an output optical signal 505*a* and an output optical signal 505*b*. As noted above, because the MMI circuitry 508 is symmetrical, the powers of the output optical signal 505*a* and the output optical signal 505*b* are both equal to half of the power of the output optical signal 209*a*. Stated otherwise, the first power-splitting ratio is 1:1. The MMI circuitry 508 also inherently adds a phase shift to the output optical signal 505*a* and the output optical signal 505*b*. The output optical signal 505*a* includes the first phase shift, and the output optical signal 505*b* includes the second phase shift. As noted above, the first phase shift is from about 200° to about 270° and the second phase shift is from about 110° to about 180°.

The output optical signal 505*a* and the output optical signal 505*b* are then provided to the stage circuitry 506*a*. As noted above, the stage circuitry 506*a* creates the optical signal path P7 and the optical signal path P8. The optical signal path P7 has the optical signal path length 215. The optical signal path P8 has an optical signal path length 520. In one or more examples, the optical signal path length 520 is equal to X plus ΔX divided by 2. Stated differently, the stage circuitry 506*a* delays the output optical signal 505*b* from the output optical signal 505*a*. After passing through the stage circuitry 506*a*, the output optical signal 505*a* and the output optical signal 505*b* are provided to the MMI circuitry 510.

In one or more examples, the MMI circuitry 510 is configured the same as the MMI circuitry 208. Because the MMI circuitry 510 is an asymmetric MMI circuitry, the MMI circuitry 510 re-combines the output optical signal 505*a* and the output optical signal 505*b* to form a fourth re-combined optical signal and then splits the power of the fourth re-combined optical signal unevenly according to the second power splitting ratio. The MMI circuitry 510 provides an output optical signal 507*a* and an output optical signal 507*b*. As noted above, the second power splitting ratio is from about 1:4 to about 3:7. In one example, a 1:4 ratio indicates that the output optical signal 507*a* includes about 20% of the power of the fourth re-combined optical signal and the output optical signal 507*b* includes about 80% of the power of the fourth re-combined optical signal. In another example, a 3:7 ratio indicates that the output optical signal 507*a* includes about 30% of the power of the fourth re-combined optical signal and the output optical signal 507*b* includes about 70% of the power of the fourth re-combined optical signal.

Furthermore, in the same manner described above, the output optical signal 507*a* includes the first phase shift, and the output optical signal 507*b* includes the second phase shift that is inherently caused by use of an MMI circuitry. As noted above, the first phase shift is from about 200° to about 270° and the second phase shift is from about 110° to about 180°.

The output optical signal 507*a* and the output optical signal 507*b* are then provided to the stage circuitry 506*b*. As noted above the stage circuitry 506*b* creates the optical signal path P9 and the optical signal path P10. The optical signal path P9 has the optical signal path length 215. The optical signal path P10 has the optical signal path length 217. As noted above, the optical signal path length 217 is equal to the length of the optical signal path length 215 plus ΔX (i.e., X plus ΔX). Stated differently, the stage circuitry 506*b* delays the output optical signal 507*b* from the output optical signal 507*a*.

After passing through the stage circuitry 506*b*, the output optical signal 507*a* and the output optical signal 507*b* are provided to the MMI circuitry 512. In one or more examples, MMI circuitry 512 is also configured the same as the MMI circuitry 208. The MMI circuitry 512 re-combines the output optical signal 507*a* and the output optical signal 507*b* into a fifth re-combined optical signal. The MMI circuitry 512 splits the fifth re-combined optical signal into an output optical signal 509*a* and an output optical signal 509*b* according to the second power ratio. As noted above, the second power splitting ratio, is from about 1:4 to about 3:7. In one example, a 1:4 ratio indicates that the output optical signal 509*a* includes about 20% of the power of the fifth re-combined optical signal and the output optical signal 509*b* includes about 80% of the power of the fifth re-combined optical signal. Furthermore, in the same manner described above, the output optical signal 509*a* includes the first phase shift, and the output optical signal 509*b* includes the second phase shift.

The output optical signal 509*a* and the output optical signal 509*b* are then provided to the stage circuitry 506*c*. As noted above the stage circuitry 506*c* creates the optical signal path P11 and the optical signal path P12. The optical signal path P11 has the optical signal path length 217. The optical signal path P12 has the optical signal path length 215. Stated differently, the stage circuitry 506*c* delays the output optical signal 509*a* from the output optical signal 509*b*.

After passing through the stage circuitry 506*c*, the output optical signal 509*a* and the output optical signal 509*b* are provided to the MMI circuitry 514. As noted above, in one or more examples, the MMI circuitry 514 is configured the same as the MMI circuitry 212 (is a double asymmetric MMI circuitry). Because the MMI circuitry 514 is double asymmetric, the MMI circuitry 514 re-combines the output optical signal 509*a* and the output optical signal 509*b* to form a sixth re-combined optical signal and then splits the power of the sixth re-combined optical signal unevenly. The MMI circuitry 514 splits the sixth re-combined optical signal into an output optical signal 511*a* and an output optical signal 511*b* according to the third power splitting ratio. As noted above, the third power splitting ratio is from about 1:24 to about 2:23. For example, a 1:24 ratio indicates that the output optical signal 511*a* includes about 4% of the power of the sixth re-combined optical signal and the output optical signal 511*b* includes about 96% of the power of the sixth re-combined optical signal.

In one or more examples, because the filter circuitry 500 is a four-channel filter circuitry, the output optical signal 511*a* and the output optical signal 511*b* correspond to the first separated optical signal OS1 and the second separated optical signal OS2. The output optical signal 511*a* and the output optical signal 511*b* are provided to the first MRM circuitry 116 and the second MRM circuitry 118, respectively, via the optical output 516 and the optical output 518, respectively. As noted above, the third power splitting ratio is from about 1:24 to about 2:23

The MMI circuitry 514 also inherently adds a phase shift to the output optical signal 511*a* and the output optical signal 511*b*. The output optical signal 511*a* includes the first phase shift, and the output optical signal 511*b* includes the third phase shift.

In one or more examples, the filter circuitry 501*b* includes an optical input 560, an optical input 562, a stage circuitry 564*a*, an stage circuitry 564*b*, a stage circuitry 564*c*, an optical output 574, and an optical output 576. The filter circuitry 501*b* includes two or more channels. In one more examples, the filter circuitry 501*b* includes a channel 571*a* and a channel 571*b*. Even though a two-channel filter circuitry 501*a* is described herein, this is for example purposes only. It is understood that any suitable quantity of channels may be included in the filter circuitry 501*b*.

The stage circuitry 564*a* creates an optical signal path P13 and an optical signal path P14 with optical signal path lengths that are different from one another. The stage circuitry 564*b* creates an optical signal path P15 and an optical signal path P16 with optical signal path lengths that are different from one another. The stage circuitry 564*c* creates an optical signal path P17 and an optical signal path P18 with optical signal path lengths that are different from one another. In one or more examples, the filter circuitry 501*b* further includes MMI circuitries disposed at the input and outputs of each of the optical signal paths. A MMI circuitry 566 is disposed between the inputs and the stage circuitry 564*a*. A MMI circuitry 568 is disposed between the stage circuitry 564*a* and the stage circuitry 564*b*. A MMI circuitry 570 is disposed between the stage circuitry 564*b* and the stage circuitry 564*c*. A MMI circuitry 572 is disposed between the stage circuitry 564*c* and the outputs.

The filter circuitry 501*b* receives the output optical signal 209*b*, and outputs a third separated optical signal via the channel 571*a* (i.e., the optical output 574) and outputs a fourth separated optical signal via the channel 571*b* (i.e., the optical output 576).

In the same manner described above, the filter circuitry 501*b* functions as a flat-top filter. The multiple MMI circuitries and optical signal paths split the received output optical signal 209*b* into two different channels with different power ratios and phase shifts (caused by the MMI circuitries) and delays (caused by the difference in optical distances between corresponding optical signal paths).

In one or more examples, the MMI circuitry 566 is a symmetric MMI circuitry, the MMI circuitry 568 and the MMI circuitry 570 are asymmetric MMI circuitries, and the MMI circuitry 572 is a double asymmetric MMI circuitry. Advantageously, the each of the MMI circuitries are optical waveguides that combine the optical signals on the channel 571*a* and the channel 571*b*, and split (or re-split) the combined optical signal into two separate optical signals with different phase shifts and/or power ratios that are provided to the channel 571*a* and the channel 571*b*.

Referring back to FIG. 5, the optical input 560 is coupled to the optical output 216. The optical input 562 is not coupled to an input signal.

In one or more examples, the MMI circuitry 566 and the MMI circuitry 206 are the same. In one or more examples, because the MMI circuitry 566 is symmetric and is only receiving the output optical signal 209*b*, the MMI circuitry 206 splits the power of the output optical signal 209*a* in evenly using the first power splitting ratio between both channels. The MMI circuitry 566 splits the output optical signal 209*b* into an output optical signal 563*a* and an output optical signal 563*b*. As noted above, because the MMI circuitry 566 is symmetrical, the powers of the output optical signal 563*a* and the output optical signal 563*b* are both equal to half of the power of output optical signal 209*b*. Stated otherwise, the first power-splitting ratio is 1:1. The MMI circuitry 566 also inherently adds a phase shift to the output optical signal 563*a* and the output optical signal 563*b*. The output optical signal 563*a* includes the first phase shift, and the output optical signal 563*b* includes the second phase shift.

The output optical signal 563*a* and the output optical signal 563*b* are then provided to the stage circuitry 564*a*. As noted above, the stage circuitry 564*a* creates the optical signal path P13 and the optical signal path P14. The optical signal path P13 has the optical signal path length 215. The optical signal path P14 has the optical signal path length 520. After passing through the stage circuitry 564*a*, the output optical signal 563*a* and the output optical signal 563*b* are provided to the MMI circuitry 568.

In one or more examples, the MMI circuitry 568 is configured the same as the MMI circuitry 208. Because the MMI circuitry 568 is an asymmetric MMI circuitry, the MMI circuitry 568 re-combines the output optical signal 563*a* and the output optical signal 563*b* to form a seventh re-combined optical signal and then splits the power of the seventh re-combined optical signal unevenly according to the second power splitting ratio. The MMI circuitry 568 splits toe seventh re-combined optical signal into an output optical signal 565*a* and an output optical signal 565*b*. As noted above, the second power splitting ratio, is from about 1:4 to about 3:7. In one example, a 1:4 ratio indicates that the output optical signal 565*a* includes about 20% of the power of the seventh re-combined optical signal and the output optical signal 565*b* includes about 80% of the power of the seventh re-combined optical signal. In another example, a 3:7 ratio indicates that the output optical signal 565*a* includes about 30% of the power of the seventh re-combined optical signal and the output optical signal 565*b* includes about 70% of the power of the seventh re-combined optical signal.

Furthermore, in the same manner described above, the output optical signal 565*a* includes the first phase shift, and the output optical signal 565*b* includes the second phase shift that is inherently caused by use of an MMI circuitry.

The output optical signal 565*a* and the output optical signal 565*b* are then provided to the stage circuitry 564*b*. As noted above the stage circuitry 564*b* creates the optical signal path P15 and the optical signal path P16. The optical signal path P15 has the optical signal path length 215. The optical signal path P16 has the optical signal path length 217. As noted above, the optical signal path length 217 is equal to the length of the optical signal path length 215 plus ΔX (i.e., X plus ΔX). Stated differently, the stage circuitry 564*b* delays the output optical signal 565*b* from the output optical signal 565*a*.

After passing through the stage circuitry 564*b*, the output optical signal 565*a* and the output optical signal 565*b* are provided to the MMI circuitry 570. In one or more examples, the MMI circuitry 570 is also configured the same as the MMI circuitry 208. The MMI circuitry 570 re-combines the output optical signal 565*a* and the output optical signal 565*b* into an eighth re-combined optical signal. The MMI circuitry 570 splits the eighth re-combined optical signal into an output optical signal 567*a* and an output optical signal 567*b* according to the second power splitting ratio. As noted above, the second power splitting ratio, is from about 1:4 to about 3:7. In one example, a 1:4 ratio indicates that the output optical signal 567*a* includes about 20% of the power of the eighth re-combined optical signal and the output optical signal 567*b* includes about 80% of the power of the eighth re-combined optical signal. Furthermore, in the same manner described above, the output optical signal 567*a* includes the first phase shift, and the output optical signal 567*b* includes the second phase shift.

The output optical signal 567*a* and the output optical signal 567*b* are then provided to the stage circuitry 564*c*. As noted above the stage circuitry 564*c* creates the optical signal path P17 and the optical signal path P18. The optical signal path P17 has the optical signal path length 217. The optical signal path P18 has the optical signal path length 215. Stated differently, the stage circuitry 564*c* delays the output optical signal 567*a* from the output optical signal 567*b*.

After passing through the stage circuitry 564*c*, the output optical signal 567*a* and the output optical signal 567*b* are provided to the MMI circuitry 572. As noted above, in one or more examples, the MMI circuitry 572 is configured the same as the MMI circuitry 212 (is a double asymmetric MMI circuitry). Because the MMI circuitry 572 is double asymmetric, the MMI circuitry 572 re-combines the output optical signal 567*a* and the output optical signal 567*b* to form a ninth re-combined optical signal and then splits the power of the ninth re-combined optical signal unevenly according to the third power splitting ratio. The MMI circuitry 572 splits the ninth re-combined optical signal into an output optical signal 569*a* and an output optical signal 569*b* according to the third power ratio. As noted above, the third power splitting ratio is from about 1:24 to about 2:23. For example, a 1:24 ratio indicates that the output optical signal 569*a* includes about 4% of the power of the ninth re-combined optical signal and the output optical signal 569*b* includes about 96% of the power of the ninth re-combined optical signal.

In one or more examples, because the filter circuitry 500 is a four-channel filter circuitry, the output optical signal 569*a* and the output optical signal 569*b* correspond to the third separated optical signal and the fourth separated optical signal described above. The output optical signal 569*a* and the output optical signal 569*b* are provided to a third MRM circuitry and a fourth MRM circuitry of the MRM array circuitry 115 (not shown), respectively, via the optical output 574 and the optical output 576, respectively.

The MMI circuitry 572 also inherently adds a phase shift to the output optical signal 569*a* and the output optical signal 569*b*. The output optical signal 569*a* includes the first phase shift, and the output optical signal 569*b* includes the third phase shift.

As described above, optical paths of the filter circuitry 501*a* and the filter circuitry 501*b* that correspond to optical paths of the filter circuitry 111 with optical path lengths less than X have optical path lengths that are equal to half of the optical path lengths in the filter circuitry 111. For example, the optical signal path length 217 (i.e., the optical path length of optical path P2) is double the optical signal path length 520 (i.e., the optical path length of optical paths P8 and P14). The optical signal path length 218 (i.e., the optical path length of optical paths P4 and P5) is double the optical signal path length 217 (i.e., the optical path length of optical paths P10, P11, P16, and P17).

Although FIG. 5 illustrates a four-channel optical de-interleaver circuitry 110, this is for example purposes only and the optical de-interleaver circuitry 110 can include any suitable quantity of channels. For example, two additional filter circuitries can be coupled in cascade to both the filter circuitry 501*a* and the filter circuitry 501*b* in the same manner described in FIG. 5 to form an 8-channel optical de-interleaver circuitry. Furthermore, in the same manner described above, each of the optical paths included in the four additional filter circuitries that correspond to optical paths in the filter circuitry 501*a* and the filter circuitry 501*b* having optical path lengths less than X, will have optical path lengths that are equal to half of the corresponding optical path lengths in the filter circuitry 501*a* and the filter circuitry 501*b*. This can be further applied to any other additional stages included in an optical de-interleaver circuitry 110 with more than 8 channels (i.e., a 16-channel, a 32-channel, and so on).

Figure 6:
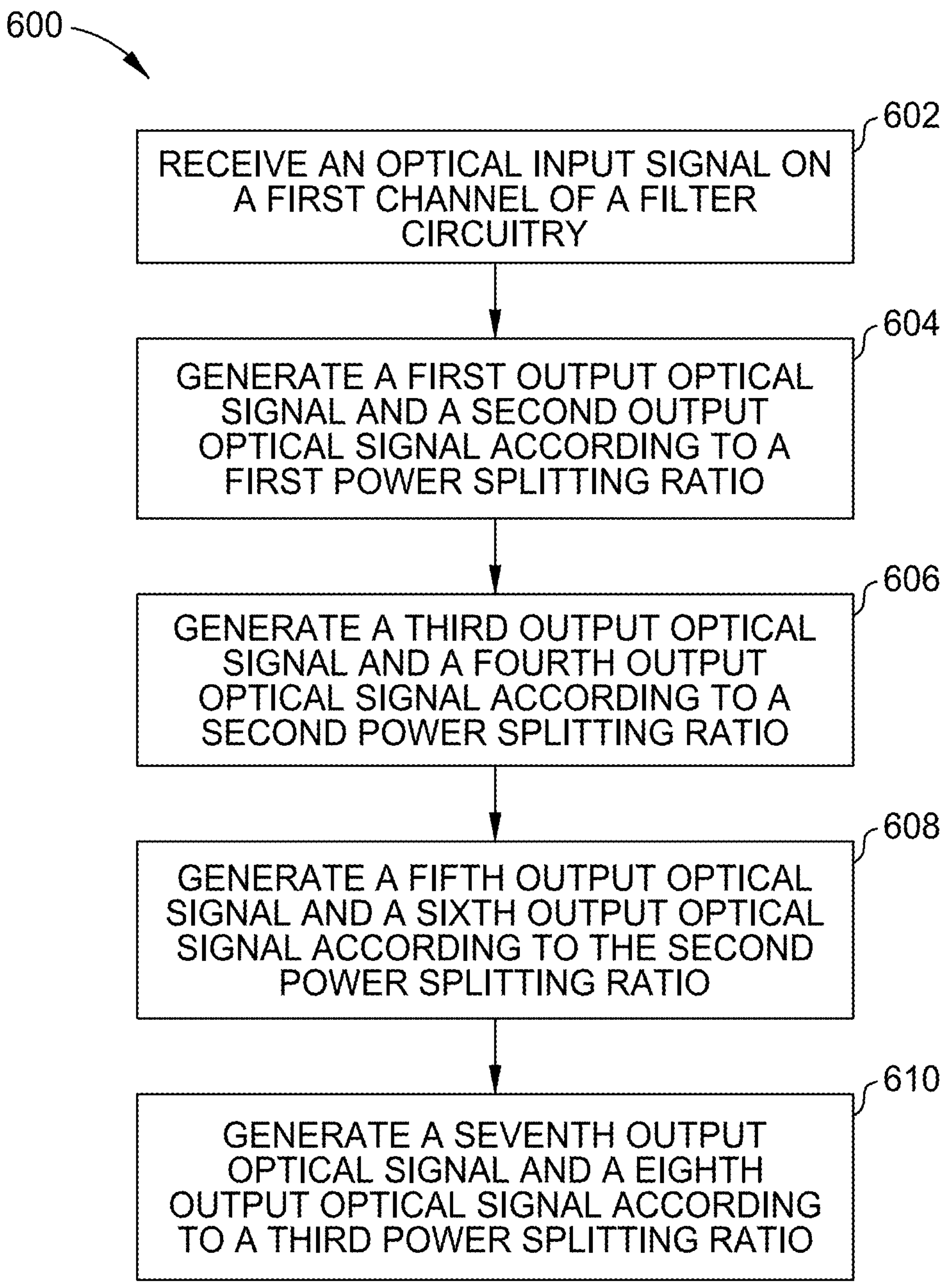
FIG. 6 illustrates a flow diagram of a method 600 for generating separated optical signals (with flat transmissive passbands) in accordance with one or more examples.

FIG. 6 illustrates a flow diagram of a method 600 for generating separated optical signals (with flat transmissive passbands) according to one or more examples.

At operation 602 of method 600, the filter circuitry 111 receives the optical input signal OSin at the optical input 202. As noted above an input signal is not received at the optical input 204.

At operation 604 of method 600, the MMI circuitry 206 generates a first output optical signal (i.e., the output optical signal 203*a*) and a second output optical signal (i.e., the output optical signal 203*b*) according to the first power splitting ratio. As noted above, because the MMI circuitry 206 is a symmetric MMI circuitry, the power of the input optical signal OSin is split evenly between the output optical signal 203*a* and the output optical signal 203*b*. Furthermore, as also noted above, the MMI circuitry 206 add the first phase shift to the output optical signal 203*a* and the second phase shift to the output optical signal 203*b*.

At operation 606 of method 600, the MMI circuitry 208 generates a third output optical signal (i.e., the output optical signal 205*a*) and a fourth output optical signal (i.e., the output optical signal 205*b*) according to the second power splitting ratio. As noted above, the MMI circuitry 208 re-combines the output optical signal 203*a* and the output optical signal 203*b* to generate a first re-combined optical signal and then splits the first re-combined optical signal into the output optical signal 205*a* and the output optical signal 205*b*. Furthermore, as also noted above, the MMI circuitry

208 adds the first phase shift to the output optical signal 205*a* and the second phase shift to the output optical signal 205*b*.

At operation 608 of method 600, the MMI circuitry 210 generates a fifth output optical signal (i.e., the output optical signal 207*a*) and a sixth output optical signal (i.e., the output optical signal 207*b*) according to the second power splitting ratio. As noted above, the MMI circuitry 210 re-combines the output optical signal 205*a* and the output optical signal 205*b* to generate a second re-combined optical signal and then splits the second re-combined optical signal into the output optical signal 207*a* and the output optical signal 207*b*. Furthermore, as also noted above, the MMI circuitry 210 adds the first phase shift to the output optical signal 207*a* and the second phase shift to the output optical signal 207*b*.

At operation 610 of method 600, the MMI circuitry 212 generates a seventh output optical signal (i.e., the output optical signal 209*a*) and an eighth output optical signal (i.e., the output optical signal 209*b*) according to the third power splitting ratio. As noted above, the MMI circuitry 212 re-combines the output optical signal 207*a* and the output optical signal 207*b* to generate a third re-combined optical signal and then splits the third re-combined optical signal into the output optical signal 209*a* and the output optical signal 209*b*. Furthermore, as also noted above, the MMI circuitry 212 add the first phase shift to the output optical signal 209*a* and the third phase shift to the output optical signal 209*b*.

As noted above embodiments herein relate to an optical de-interleaver circuitry 110 including a filter circuitry 111 that generates separated optical signals (with flat transmissive passbands) using passive circuitry components and without requiring any supplemental phase adjustments, thus improving the reliability and power consumption (performance) of the optical transceiver circuitry.

While the foregoing is directed to specific examples, other and further examples may be devised without departing from the basic scope thereof, and the scope thereof is determined by the claims that follow.

What is claimed is:

1. A filter circuitry comprising:

a first multi-mode interferometer (MMI) circuitry configured to receive an optical input signal and generate a first output optical signal and a second output optical signal according to a first power splitting ratio;

a second MMI circuitry configured to receive the first output optical signal and the second output optical signal and generate a third output optical signal and a fourth output optical signal according to a second power splitting ratio;

a third MMI circuitry configured to receive the third output optical signal and the fourth output optical signal and generate a fifth output optical signal and a sixth output optical signal according to the second power splitting ratio; and a fourth MMI circuitry configured to receive the fifth output optical signal and the sixth output optical signal and generate a seventh output optical signal and an eighth output optical signal according to a third power splitting ratio, wherein the first power splitting ratio, the second power splitting ratio, and the third power splitting ratio are different.

2. The filter circuitry of claim 1 further comprising:

a first stage circuitry disposed between the first MMI circuitry and the second MMI circuitry;

a second stage circuitry disposed between the second MMI circuitry and the third MMI circuitry; and a third stage circuitry disposed between the third MMI circuitry and the fourth MMI circuitry.

3. The filter circuitry of claim 2, wherein:

the first stage circuitry creates a first optical signal path having a first optical signal path length and a second optical signal path having a second optical signal path length;

the second stage circuitry creates a third optical signal path having the first optical signal path length and a fourth optical signal path having a third optical signal path length; and the third stage circuitry creates a fifth optical signal path having the third optical signal path length and a sixth optical signal path having the first optical signal path length, wherein the first optical signal path length, the second optical signal path length, and the third optical signal path length are different.

4. The filter circuitry of claim 1, wherein:

the first MMI circuitry is a symmetric MMI circuitry;

the second MMI circuitry and the third MMI circuitry are asymmetric MMI circuitries; and the third MMI circuitry is a double asymmetric MMI circuitry.

5. The filter circuitry of claim 1, wherein:

the first MMI circuitry is configured to add a first phase shift to the first output optical signal and a second phase shift to the second output optical signal;

the second MMI circuitry is configured to add the first phase shift to the third output optical signal and the second phase shift to the fourth output optical signal;

the third MMI circuitry is configured to add the first phase shift to the fifth output optical signal and the second phase shift to the sixth output optical signal; and the fourth MMI circuitry is configured to add the first phase shift to the seventh output optical signal and a third phase shift to the eighth output optical signal, wherein the first phase shift, the second phase shift, and the third phase shift are different from one another.

6. The filter circuitry of claim 5, wherein:

the first phase shift is from about 200° to about 270°;

the second phase shift is from about 110° to about 180°; and the third phase shift is equal to 360°.

7. The filter circuitry of claim 1, wherein:

the first power splitting ratio is equal to 1:1;

the second power splitting ratio is from about 1:4 to about 3:7; and the third power splitting ratio is from about 1:24 to about 2:23.

8. An optical transceiver circuitry comprising:

an optical input source circuitry; and an optical de-interleaver circuitry configured to receive an optical input signal from the optical input source circuitry and provide separated optical signals to a microring modulator (MRM) array circuitry, the optical de-interleaver circuitry comprising a first filter circuitry comprising:

a first multi-mode interferometer (MMI) circuitry configured to receive the optical input signal and generate a first output optical signal and a second output optical signal according to a first power splitting ratio; and a second MMI circuitry configured to receive the first output optical signal and the second output optical signal and generate a third output optical signal and a fourth output optical signal according to a second power splitting ratio.

9. The optical transceiver circuitry of claim 8, wherein the first filter circuitry further comprises:

a third MMI circuitry configured to receive the third output optical signal and the fourth output optical signal and generate a fifth output optical signal and a sixth output optical signal according to the second power splitting ratio; and a fourth MMI circuitry configured to receive the fifth output optical signal and the sixth output optical signal and generate a seventh output optical signal and an eighth output optical signal according to a third power splitting ratio, wherein the first power splitting ratio, the second power splitting ratio, and the third power splitting ratio are different.

10. The optical transceiver circuitry of claim 9, wherein the first filter circuitry further comprises:

a first stage circuitry disposed between the first MMI circuitry and the second MMI circuitry;

a second stage circuitry disposed between the second MMI circuitry and the third MMI circuitry; and a third stage circuitry disposed between the third MMI circuitry and the fourth MMI circuitry.

11. The optical transceiver circuitry of claim 10, wherein:

the first stage circuitry creates a first optical signal path having a first optical signal path length and a second optical signal path having a second optical signal path length;

the second stage circuitry creates a third optical signal path having the first optical signal path length and a fourth optical signal path having a third optical signal path length; and the third stage circuitry creates a fifth optical signal path having the third optical signal path length and a sixth optical signal path having the first optical signal path length, wherein the first optical signal path length, the second optical signal path length, and the third optical signal path length are different.

12. The optical transceiver circuitry of claim 9, wherein:

the first MMI circuitry is a symmetric MMI circuitry;

the second MMI circuitry and the third MMI circuitry are asymmetric MMI circuitries; and the fourth MMI circuitry is a double asymmetric MMI circuitry.

13. The optical transceiver circuitry of claim 9, wherein the first MMI circuitry is configured to add first phase shift to the first output optical signal and a second phase shift to the second output optical signal;

the second MMI circuitry is configured to add the first phase shift to the third output optical signal and the second phase shift to the fourth output optical signal;

the third MMI circuitry is configured to add the first phase shift to the fifth output optical signal and the second phase shift to the sixth output optical signal; and the fourth MMI circuitry is configured to add the first phase shift to the seventh output optical signal and a third phase shift to the eighth output optical signal, wherein the first phase shift, the second phase shift, and the third phase shift are different from one another.

14. The optical transceiver circuitry of claim 13, wherein:

the first phase shift is from about 200° to about 270°;

the second phase shift is from about 110° to about 180°; and the third phase shift is equal to 290-360°.

15. The optical transceiver circuitry of claim 9, wherein:

the first power splitting ratio is equal to 1:1;

the second power splitting ratio is from about 1:4 to about 3:7; and the third power splitting ratio is from about 1:24 to about 2:23.

16. The optical transceiver circuitry of claim 8, wherein the optical de-interleaver circuitry further comprises a second filter circuitry and a third filter circuitry coupled to the first filter circuitry in cascade.

17. The optical transceiver circuitry of claim 8, wherein the separated optical signals comprise a first separated optical signal provided to a first MRM circuitry of the MRM array circuitry via a first channel of the first filter circuitry and a second separated optical signal provided to a second MRM circuitry of the MRM array circuitry via a second channel of the first filter circuitry.

18. The optical transceiver circuitry of claim 17, wherein the first MRM circuitry is further configured to generate a first modulated optical signal based on the first separated optical signal and the second MRM circuitry is further configured to generate a second modulated optical signal based on the second separated optical signal, and the optical transceiver circuitry further comprises an optical interleaver circuitry configured to:

receive the first modulated optical signal and the second modulated optical signal; and provide an optical output signal based on the first modulated optical signal and the second modulated optical signal to a receiver circuitry.

19. A method comprising:

receiving, by a filter circuitry, an optical input signal of the filter circuitry;

generating, by a first multi-mode interferometer (MMI) circuitry of the filter circuitry, a first output optical signal and a second output optical signal of the filter circuitry according to a first power splitting ratio;

generating, by a second MMI circuitry of the filter circuitry, a third output optical signal and a fourth output optical signal according to a second power splitting ratio;

generating, by a third MMI circuitry of the filter circuitry, a fifth output optical signal and a sixth output optical signal according to the second power splitting ratio; and generating, by a fourth MMI circuitry of the filter circuitry, a seventh output optical signal and a eighth output optical signal according to a third power splitting ratio, wherein the first power splitting ratio, the second power splitting ratio, and the third power splitting ratio are different.

20. The method of claim 19, further comprising:

adding, by the first MMI circuitry, a first phase shift to the first output optical signal and a second phase shift to the second output optical signal;

adding, by the second MMI circuitry, the first phase shift to the third output optical signal and the second phase shift to the fourth output optical signal;

adding, by the third MMI circuitry, the first phase shift to the fifth output optical signal and the second phase shift to the sixth output optical signal; and adding, by the fourth MMI circuitry, the first phase shift to the seventh output optical signal and a third phase shift to the eighth output optical signal, wherein the first phase shift and the second phase shift, and the third phase shift are different from one another.

* * * * *